US012728620B2

(12) United States Patent
Ozol et al.

(10) Patent No.: US 12,728,620 B2
(45) **Date of Patent: *Sep. 8, 2026**

(54) PROTECTIVE COMPOSITE FABRICS AND METHODS OF MANUFACTURE AND USE

(71) Applicant: Transhield, Inc., Elkhart, IN (US)

(72) Inventors: Seckin Ozol, South Bend, IN (US); Gregory L. Todt, Union, MI (US); Na Qi, Granger, IN (US)

(73) Assignee: Transhield, Inc., Elkhart, IN (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/406,846

(22) Filed: Jan. 8, 2024

(65) Prior Publication Data

US 2024/0399705 A1 Dec. 5, 2024

Related U.S. Application Data

(63) Continuation of application No. 18/333,022, filed on Jun. 12, 2023, now Pat. No. 12,350,920, which is a (Continued)

(51) Int. Cl.

*B32B 5/26* (2006.01)
*B32B 3/14* (2006.01)

(Continued)

(52) U.S. Cl.

CPC .................. *B32B 5/26* (2013.01); *B32B 3/16* (2013.01); *B32B 7/12* (2013.01); *B32B 27/12* (2013.01);

(Continued)

(58) Field of Classification Search

CPC .. B32B 5/26; B32B 3/16; B32B 27/12; B32B 27/40; B32B 3/14; B32B 3/08; B32B 2307/752

See application file for complete search history.

(56) References Cited

U.S. PATENT DOCUMENTS

| | | | |
|---|---|---|---|
| 687,123 | A | 11/1901 | Chalmer |
| 2,675,330 | A | 4/1954 | Schwartz et al. |

(Continued)

FOREIGN PATENT DOCUMENTS

| | | | |
|---|---|---|---|
| EP | 825019 | A2 | 2/1998 |
| EP | 1099541 | A1 | 5/2001 |

(Continued)

OTHER PUBLICATIONS

Japanese Patent Office; Office Action; Apr. 15, 2025; entire document and translation.

(Continued)

*Primary Examiner* — Joanna Pleszczynska
(74) *Attorney, Agent, or Firm* — Price Heneveld LLP

(57) ABSTRACT

A composite fabric includes a film having a first side and a second sides, a first fibrous layer having a first side facing the second side of the film and a second side, a fabric layer having a first side facing the second side of the first fibrous layer and a second side, a second fibrous layer having a first side facing the second side of the fabric layer and a second side, and a plurality of retaining members connected to and extending away from the second side of the second fibrous layer, the plurality of retaining members configured to contact a surface on which the composite fabric is placed to resist movement of the composite fabric relative to the surface and such that the second side of the fibrous layer is entirely spaced from the surface.

28 Claims, 4 Drawing Sheets

Related U.S. Application Data continuation of application No. 17/324,450, filed on May 19, 2021, now abandoned.

(60) Provisional application No. 63/028,814, filed on May 22, 2020.

(51) Int. Cl.

| | |
|---|---|
| ***B32B 3/16*** | (2006.01) |
| ***B32B 7/12*** | (2006.01) |
| ***B32B 27/12*** | (2006.01) |
| ***B32B 27/38*** | (2006.01) |
| ***B32B 27/40*** | (2006.01) |

(52) U.S. Cl.

CPC .......... *B32B 27/38* (2013.01); *B32B 2307/71* (2013.01); *B32B 2307/752* (2013.01)

(56) References Cited

U.S. PATENT DOCUMENTS

| | | | |
|---|---|---|---|
| 4,233,027 | A | 11/1980 | Albero |
| 4,459,332 | A | 7/1984 | Giglia |
| 4,900,608 | A | 2/1990 | Stamper |
| 4,973,514 | A | 11/1990 | Gamble et al. |
| 4,996,109 | A | 2/1991 | Krieg et al. |
| 5,068,061 | A | 11/1991 | Knobel et al. |
| 5,077,556 | A | 12/1991 | Aisslinger |
| 5,283,112 | A | 2/1994 | Krishnan |
| 5,308,683 | A | 5/1994 | Dees, Jr. et al. |
| 5,491,017 | A | 2/1996 | Todt |
| 5,543,195 | A | 8/1996 | Squires et al. |
| 5,564,127 | A | 10/1996 | Manne |
| 5,565,158 | A | 10/1996 | Sullivan et al. |
| 5,623,812 | A | 4/1997 | Todt |
| 5,705,566 | A | 1/1998 | Todt |
| 5,712,008 | A | 1/1998 | Todt |
| 5,736,231 | A | 4/1998 | Todt |
| 5,863,633 | A | 1/1999 | Squires et al. |
| 5,888,616 | A | 3/1999 | Ang |
| 5,906,873 | A | 5/1999 | Kim |
| 6,043,169 | A | 3/2000 | Jaffee |
| 6,045,900 | A | 4/2000 | Haffner et al. |
| 6,339,121 | B1 | 1/2002 | Rafailovich et al. |
| 6,444,595 | B1 | 9/2002 | Elkouh et al. |
| 6,562,740 | B1 | 5/2003 | Todt |
| 6,638,589 | B1 | 10/2003 | Jrvenkyl |
| 6,696,120 | B1 | 2/2004 | Todt |
| 6,794,317 | B2 | 9/2004 | Elkouh et al. |
| 6,833,334 | B1 | 12/2004 | Elkouh et al. |
| 6,866,411 | B1 | 3/2005 | Stelzer et al. |
| 6,875,712 | B2 | 4/2005 | Todt |
| 6,962,739 | B1 | 11/2005 | Kim et al. |
| 7,018,692 | B2 | 3/2006 | Kim et al. |
| 7,074,288 | B2 | 7/2006 | Todt |
| 7,160,949 | B2 | 1/2007 | Ota et al. |
| 7,183,230 | B2 | 2/2007 | Elkouh et al. |
| 7,199,180 | B1 | 4/2007 | Simmons et al. |
| 7,344,765 | B2 | 3/2008 | Hayakawa et al. |
| 7,355,743 | B2 | 4/2008 | Mcmanus et al. |
| 7,393,799 | B2 | 7/2008 | Porter |
| 7,601,921 | B2 | 10/2009 | Schroader |
| 7,645,507 | B2 | 1/2010 | Vermunicht et al. |
| 7,744,806 | B2 | 6/2010 | Broadus et al. |
| 7,784,112 | B2 | 8/2010 | Shwartz et al. |
| 8,012,572 | B2 | 9/2011 | Ramli et al. |
| 8,015,272 | B2 | 9/2011 | Yoshiuchi et al. |
| 8,465,684 | B1 | 6/2013 | Tsai |
| 8,637,139 | B2 | 1/2014 | Todt et al. |
| 8,828,487 | B2 | 9/2014 | Todt et al. |
| 8,871,319 | B2 | 10/2014 | Stanley et al. |
| 8,883,284 | B2 | 11/2014 | Todt et al. |
| 9,718,998 | B2 | 8/2017 | Todt et al. |
| 9,926,029 | B2 | 3/2018 | Rucker |
| 10,409,326 | B2 | 9/2019 | Buechin |
| 10,633,567 | B2 | 4/2020 | Dubois |
| 2001/0008672 | A1 | 7/2001 | Norvell et al. |
| 2003/0151159 | A1 | 8/2003 | Santisteban et al. |
| 2003/0190463 | A1 | 10/2003 | Inoue et al. |
| 2003/0220041 | A1 | 11/2003 | Elkouh et al. |
| 2004/0166758 | A1 | 8/2004 | Reichmann et al. |
| 2004/0176009 | A1 | 9/2004 | Hatta et al. |
| 2005/0009429 | A1 | 1/2005 | Park et al. |
| 2005/0176331 | A1 | 8/2005 | Martin et al. |
| 2007/0264897 | A1 | 11/2007 | Collias et al. |
| 2008/0011034 | A1 | 1/2008 | Hochrein et al. |
| 2008/0015278 | A1 | 1/2008 | Malik et al. |
| 2008/0102725 | A1 | 5/2008 | Lacey et al. |
| 2008/0105612 | A1 | 5/2008 | Chappas |
| 2008/0176468 | A1 | 7/2008 | Chen |
| 2009/0221767 | A1 | 9/2009 | Malet |
| 2010/0003486 | A1 | 1/2010 | Lalgudi et al. |
| 2010/0215924 | A1 | 8/2010 | Di Pede |
| 2010/0266774 | A1 | 10/2010 | Yang |
| 2010/0272898 | A1 | 10/2010 | Chen et al. |
| 2010/0272914 | A1 | 10/2010 | Chen et al. |
| 2011/0041970 | A1 | 2/2011 | Chang |
| 2011/0092120 | A1 | 4/2011 | Todt et al. |
| 2012/0015161 | A1 | 1/2012 | Todt et al. |
| 2012/0071051 | A1 | 3/2012 | Ray |
| 2012/0171409 | A1 | 7/2012 | Todt et al. |
| 2013/0219600 | A1 | 8/2013 | Atorrasagasti et al. |
| 2015/0123304 | A1 | 5/2015 | Ashraf et al. |
| 2017/0144406 | A1 | 5/2017 | Crotty |
| 2017/0208905 | A1 | 7/2017 | Viskup |
| 2018/0049529 | A1 | 2/2018 | Buechin |
| 2019/0090390 | A1 | 3/2019 | Judy |

FOREIGN PATENT DOCUMENTS

| | | | |
|---|---|---|---|
| EP | 3243939 | B1 | 2/2020 |
| GB | 2205275 | B | 6/1989 |
| JP | 56121670 | U | 9/1981 |
| JP | 10081359 | A | 3/1998 |
| JP | 2002096432 | A | 4/2002 |
| JP | 2002160706 | A | 6/2002 |
| JP | 2004330692 | A | 11/2004 |
| JP | 5260391 | B2 | 8/2013 |
| JP | 5439841 | B2 | 3/2014 |
| JP | 2019199256 | A | 11/2019 |
| KR | 100809266 | B1 | 2/2008 |
| WO | 9611804 | A2 | 4/1996 |
| WO | 2005059188 | A2 | 6/2005 |
| WO | 2007037517 | A1 | 4/2007 |
| WO | 2008056123 | A1 | 5/2008 |
| WO | 2009143251 | A2 | 11/2009 |
| WO | 2010022066 | A2 | 2/2010 |
| WO | 2012031232 | A2 | 3/2012 |
| WO | 2017172360 | A1 | 10/2017 |
| WO | 2019116174 | A1 | 6/2019 |
| WO | 2020116174 | A1 | 6/2020 |

OTHER PUBLICATIONS

Ebnesajjad, Sina and Ebnesajjad, Cyrus, Surface Treatment of Materials for Adhesion Bonding, 2006, pp. 79, 207, 211 and 245, William Andrew Publishing, New York, USA.

Kraton Polymers LLC, Kraton Launches Styrenic Block Copolymers {SBC) for Coextruded Pressure Sensitive Adhesive Films, Feb. 17, 2006, 2 pages.

Li, Julie, Styrenic Block Copolymers in Medical Applications, InterPlas Thailand, Jun. 20, 2013, Bangkok, 37 pages.

Miksic, Boris and Rudman, Barry, A Recent Breakthrough in Shrink Film Technology, Jul. 23, 1998, 9 pages.

Meth, Wolf R., Diffusion In and Through Polymers Principles and Applications: Chapter 4 The Permeation Process, 1991, pp. 73-110, Oxford University Press, New York, USA.

Wilson, Reuben D., Styrenic Block Copolymers, ASI Adhesives & Sealants Industry, Sep. 1, 2008, 9 pages.

Korean Patent Office, International Search Report issued in PCT/US2011/050387, 4 pages, Apr. 18, 2012.

(56) References Cited

OTHER PUBLICATIONS

European Patent Office, International Search Report issued in PCT/US2021/033312, Aug. 17, 2021, 6 pages.
European Patent Office, Written Opinion issued in PCT/US2021/033312, Aug. 17, 2021, 7 pages.

See Fig. 4
21
22
23
24
30
40
50
51
60
70
51/71
100
110
111

PROTECTIVE COMPOSITE FABRICS AND METHODS OF MANUFACTURE AND USE

CROSS-REFERENCE TO RELATED APPLICATIONS

This application is a continuation of U.S. patent application Ser. No. 18/333,022, entitled "PROTECTIVE COMPOSITE FABRICS AND METHODS OF MANUFACTURE AND USE," filed Jun. 12, 2023, now U.S. Pat. No. 12,350,920, which is a continuation of U.S. patent application Ser. No. 17/324,450, filed May 19, 2021, entitled "PROTECTIVE COMPOSITE FABRICS AND METHODS OF MANUFACTURE AND USE," which claims priority to U.S. Provisional Application No. 63/028,814, filed on May 22, 2020, entitled "PROTECTIVE COMPOSITE FABRICS AND METHODS OF MANUFACTURE AND USE," the entire disclosures of which are incorporate herein by reference.

The present invention relates to protective composite fabrics and methods of manufacturing and using protective composite fabrics.

BACKGROUND

Protective fabrics and other constructs can be used to prevent corrosion, scratches and other damage to surfaces and objects that can result from contact with other objects, rain, wind, sunlight, the elements and other sources of harm. Examples of such fabrics and constructs are described in U.S. Pat. Nos. 6,696,120, 7,074,288, 8,828,487 and 8,883,284.

SUMMARY

In one embodiment of the present invention, a composite fabric includes a film, a first fibrous layer, a fabric layer, a second fibrous layer, and a plurality of retaining members. The film has a first side and a second side. The first fibrous layer has a first side connected to the second side of the film and a second side. The fabric layer has a first side connected to the second side of the first fibrous layer and a second side. The second fibrous layer has a first side connected to the second side of the fabric layer and a second side. The retaining members are connected to and extend from the second side of the second fibrous layer. The retaining members are for contacting a surface on which the composite fabric is placed and resisting movement of the composite fabric relative to the surface.

In one embodiment, the film is a non-heat shrinking film.

In other embodiments, the retaining members include a vapor corrosion inhibitor. In certain embodiments, the retaining members include a contact corrosion inhibitor.

In another embodiment, the plurality of retaining members form at least one pocket between one or more of the plurality of retaining members, the second side of the second fibrous layer, and the surface, and the composite fabric includes a vapor corrosion inhibitor, at least a portion of which collects in one or more of the pockets.

In certain embodiments, the retaining members are constructed from epoxy. In other embodiments, the retaining members are constructed from polyurethane.

In another embodiment, the composite fabric further includes a pH modifier.

In one embodiment, the composite fabric includes an adhesive between the film and the first fibrous layer. In some embodiments the composite fabric includes a vapor corrosion inhibitor in the adhesive. In another embodiment, the adhesive adheres the film to the first fibrous layer and the water saturated bond strength adhesion between the film and the first fibrous layer in the machine direction is at least 1,000 g/cm. In yet another embodiment, the adhesive adheres the film to the first fibrous layer and the water saturated bond strength adhesion between the film and the first fibrous layer in the cross direction is at least 1,000 g/cm.

In one embodiment, the film is a multilayer film.

In another embodiment, the composite fabric includes electromagnetic shielding.

In one embodiment of the present invention, a composite fabric includes a non-heat shrinking film, a first fibrous layer, a fabric layer, and a second fibrous layer. The film has a first side and a second side. The first fibrous layer has a first side connected to the second side of the film and a second side. The fabric layer has a first side connected to the second side of the first fibrous layer and a second side. The second fibrous layer has a first side connected to the second side of the fabric layer and a second side.

In one embodiment, the composite fabric includes a plurality of retaining members connected to and extend from the second side of the second fibrous layer. The retaining members are for contacting a surface on which the composite fabric is placed and resisting movement of the composite fabric relative to the surface.

In other embodiments, the retaining members include a vapor corrosion inhibitor. In certain embodiments, the retaining members include a contact corrosion inhibitor.

In another embodiment, the plurality of retaining members form at least one pocket between one or more of the plurality of retaining members, the second side of the second fibrous layer, and the surface, and the composite fabric includes a vapor corrosion inhibitor, at least a portion of which collects in one or more of the pockets.

In certain embodiments, the retaining members are constructed from epoxy. In other embodiments, the retaining members are constructed from polyurethane.

In another embodiment, the composite fabric further includes a pH modifier.

In one embodiment, the composite fabric includes an adhesive between the film and first fibrous layer, a fabric layer, a second fibrous layer, a second film, and a plurality of retaining members. The first film has a first side and a second side. The first fibrous layer has a first side connected to the second side of the first film and a second side. The fabric layer has a first side connected to the second side of the first fibrous layer and a second side. The second fibrous layer has a first side connected to the second side of the fabric layer and a second side. The second film has a first side connected to the second side of the second fibrous layer and a second side. The retaining members are connected to and extend from the second side of the second film layer. The retaining members are for contacting a surface on which the composite fabric is placed and resisting movement of the composite fabric relative to the surface.

In one embodiment, the film is a multilayer film.

In another embodiment, the composite fabric includes electromagnetic shielding.

In one embodiment of the present invention, a composite fabric includes a first film, a first fibrous layer, a fabric layer, a second fibrous layer, a second film, and a plurality of retaining members. The first film has a first side and a second side. The first fibrous layer has a first side connected to the second side of the first film and a second side. The fabric layer has a first side connected to the second side of the first fibrous layer and a second side. The second fibrous layer has a first side connected to the second side of the fabric layer and a second side. The second film has a first side connected to the second side of the second fibrous layer and a second side. The retaining members are connected to and extend from the second side of the second film layer. The retaining members are for contacting a surface on which the composite fabric is placed and resisting movement of the composite fabric relative to the surface.

In one embodiment of the present invention, a method of producing a composite fabric includes providing a film, connecting a first fibrous layer to the film, connecting a fabric layer to the first fibrous layer, connecting a second fibrous layer to the fabric layer, and forming a plurality of retaining members on the second fibrous layer.

These and other features of the present invention will be apparent to those of skill in the art from the following detailed description of embodiments of the invention and the accompanying drawings.

DETAILED DESCRIPTION OF THE PREFERRED EMBODIMENTS

Figure 1:
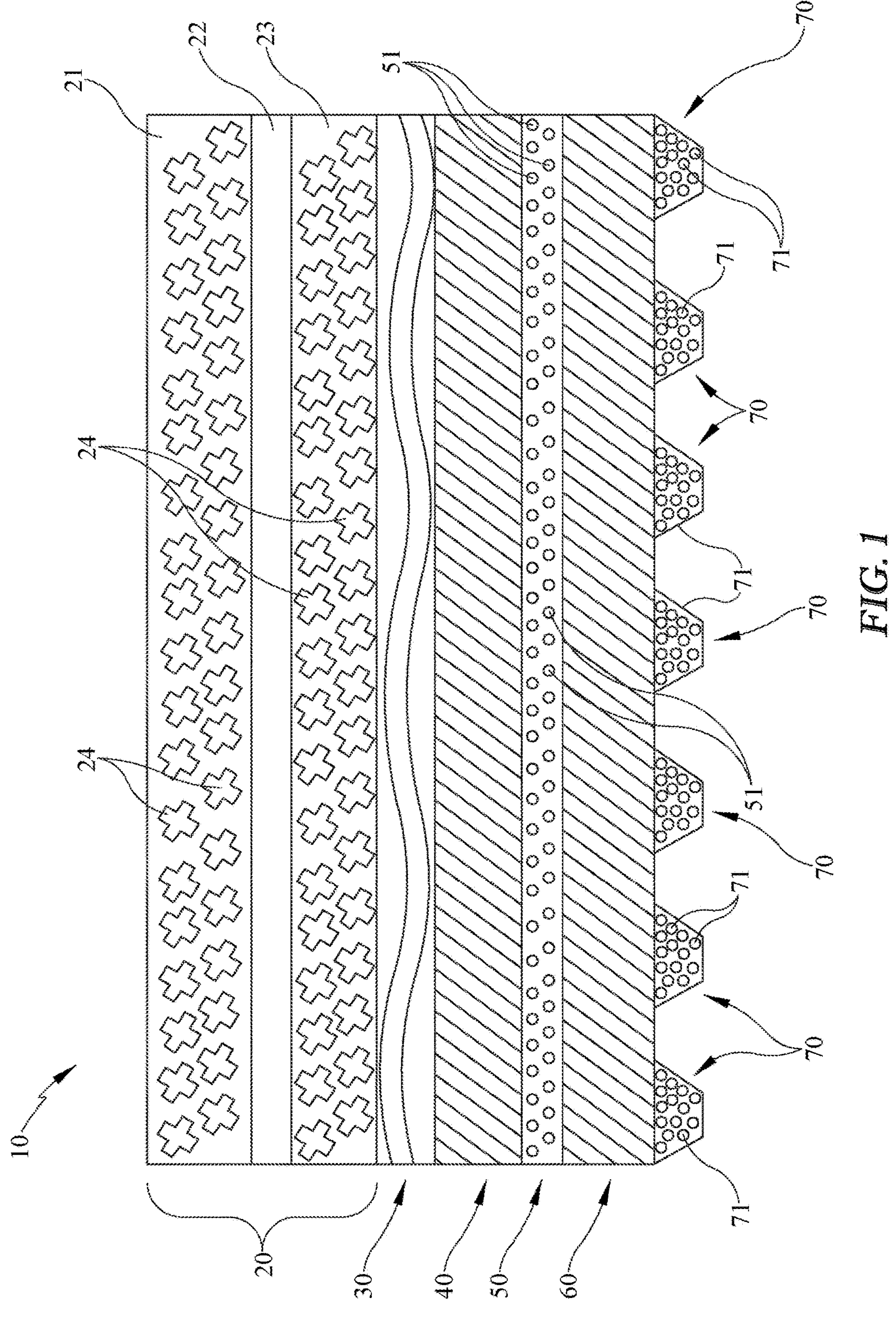
FIG. 1 is a cross sectional view of a protective composite fabric according to one embodiment of the present invention.
Figures 3, 4:
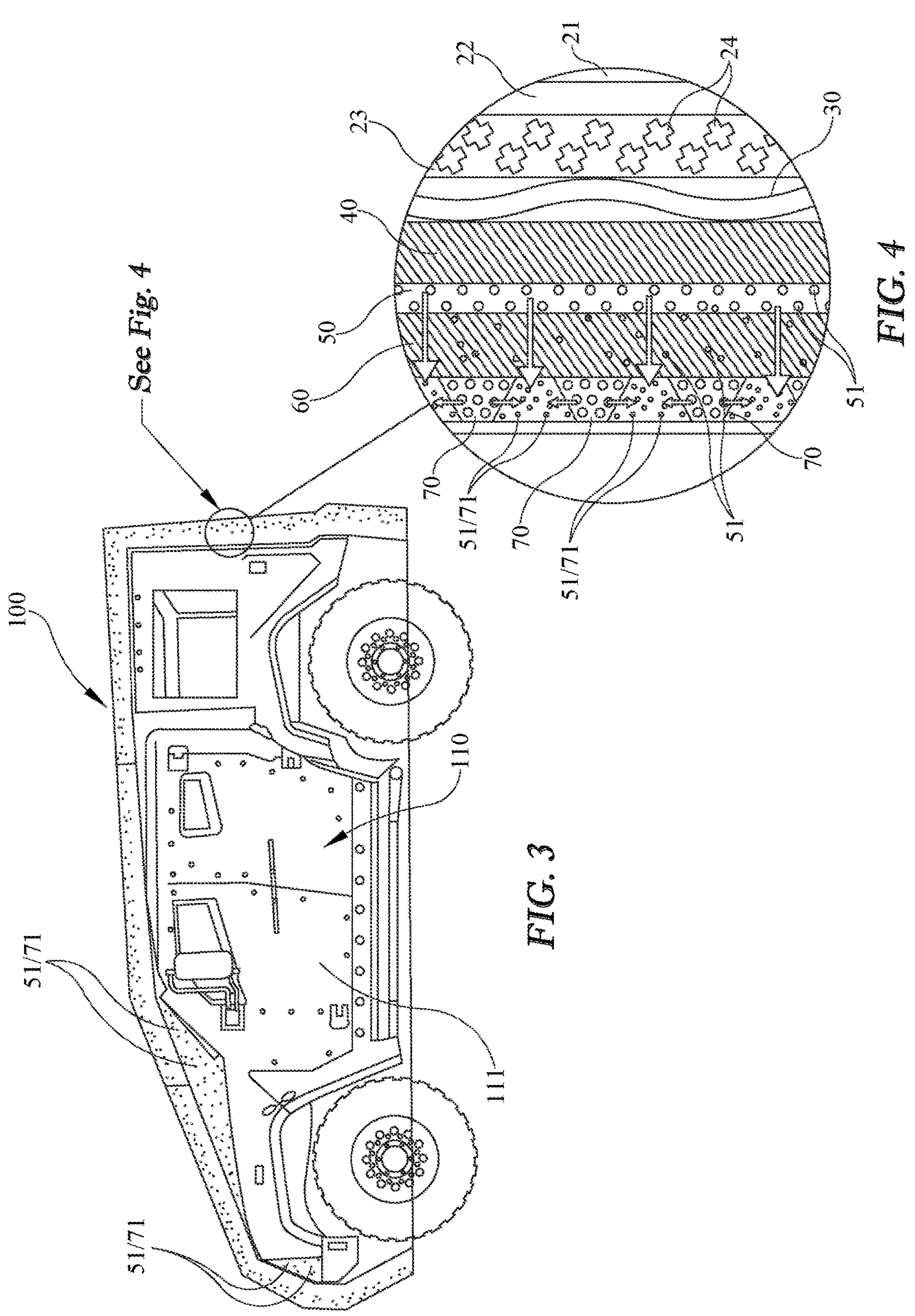
FIG. 3 is a side view of a vehicle with a protective cover constructed from protective composite fabric according to one embodiment of the present invention applied thereto and shown in cross section.
FIG. 4 is a detail of area 4 in FIG. 3.

For purposes of description herein, the terms "upper," "lower," "right," "left," "rear," "front," "vertical," "horizontal," and derivatives thereof shall relate to the invention as oriented in FIGS. 1, 3 and 4. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

FIG. 1 is a cross-sectional view of a protective composite fabric 10 according to one embodiment of the present invention. In the embodiment shown composite fabric 10 generally includes a film 20, adhesive 30, a first fibrous layer 40, a fabric layer 50, a second fibrous layer 60 and a plurality of retaining members 70.

Film 20 in the embodiment shown includes a first layer 21, a second layer 22, and a third layer 23. Film 20 is produced from a non-heat shrinking thermoplastic material. In certain embodiments of the invention, first layer 21 is a polyurethane film, and in some embodiments, is a high yield strength, thermoplastic polyurethane film. Examples of materials suitable for film 20 in certain embodiments of the invention include, but are not limited to, ESTANE® 58277 TPU available from Lubrizol Advanced Materials, Inc. of Cleveland, Ohio. In the embodiment shown, second layer 22 of film 20 is a polyurethane film. Second layer 22 can be constructed from the same material as first layer 21 or from a different material. Third layer 23 of film 20 in the embodiment shown is also a polyurethane film. In certain embodiments, third layer 23 is a high yield strength polyurethane film. In certain embodiments, first layer 21 and third layer 23 are produced from the same material. Film 20 may be produced, for example, by coextruding first layer 21, second layer 22 and third layer 23 together. Film 20 can be produced by extruding cast film and and/or blown film. In one embodiment of the present invention, first layer 21, second layer 22 and third layer 23 are coextruded to form film 20.

In certain embodiments of the invention, second layer 22 of film 20 is thicker than first layer 21 and third layer 23. In one embodiment, second layer 22 constitutes approximately 60% of the total thickness of film 20 and first layer 21 and third layer 23 each constitute approximately 20% of the total thickness of film 20. In another embodiment, second layer 22 constitutes approximately 70% of the total thickness of film 20 and first layer 21 and third layer 23 each constitute approximately 15% of the total thickness of film 20.

First layer 21 and/or third layer 23 may optionally include a pH modifier 24. Relatively higher pH levels (i.e., a more alkaline environment) help prevent the growth of mold and mildew and help protect metal surfaces from corrosion. In use, first layer 21 faces outward from the surface to be protected and inhibits mold and mildew growth on the surface of covers or other constructs made from composite fabric 10 and on fabric layer 50. Third layer 23 inhibits mold and mildew growth on fabric layer 50. In various embodiments of the present invention, pH modifiers 24 are utilized in an amount effective to produce a pH level between the composite fabric 10 and the object being protected of between about 8 and about 13. In certain embodiments of the invention, pH modifier 24 is selected to produce a pH of at least 8. Suitable pH modifiers 24 include, but are not limited to, sodium acetate, wollastonite, calcium oxide and/or calcium hydroxide. pH modifiers 24 can be added directly to the layers of film 20 or as a pH modifying component in the form of a masterbatch including one or more pH modifiers 24.

Film 20, in the embodiment shown, is an essentially waterproof construct with a high water vapor transmission rate. Film 20 thereby prevents liquid water from migrating through film 20 to the object protected by composite fabric 10, while at the same time permitting moisture vapor to pass from near the object through composite fabric 10. In certain embodiments of the invention, the water vapor transmission rate of film 20 is from about 50 $g/m^2$/day to about 200 $g/m^2$/day at 7.5 mils thickness. In one embodiment, the water vapor transmission rate of film 20 is at least 50 $g/m^2$/day. Utilizing thinner films 20 can result in even greater water vapor transmission rates, including water vapor transmission rate of at least 500 $g/m^2$/day.

Adhesive 30 joins film 20 to first fibrous layer 40. Adhesive 30 may be any adhesives sufficient to bond film 20 to first fibrous layer 40 in a manner that prevents delamination and unacceptable degradation of composite fabric 10 in use, particularly in hot, humid and/or wet environments. Examples of acceptable adhesives include, but are not limited to, polyurethane adhesives and hot melt styrene ethylene butadiene styrene (SEBS) adhesives. In one embodiment of the invention, AL1262 adhesive with a vapor corrosion inhibitor ("VCI") is utilized. In another embodiment of the invention, AL34-149-1 adhesive with VCI is utilized. These adhesives can be obtained from Adherent Laboratories, Inc. of St. Paul, Minnesota.

Various types of VCI's can be utilized in connection with embodiments of the present invention. These VCI's can be amines, nitrites, natrates, triazoles, and other volatile compounds. Certain chemistries are more effective at inhibiting corrosion of certain metals. For example, benzotriazole is a more effective VCI for copper, whereas cyclohexylamine carbonate is more effective for use with steel. Non limiting examples of vapor corrosion inhibitors useful in connection with embodiments of the present invention include: primary, secondary and tertiary aliphatic amines; aliphatic diamines; cycloaliphatic and aromatic amines; polymethylimines; long chain ethanolamines; imidazolines; amine salts, for example those of carbonic, carbamic, acetic, benzoic, oleic, nitrous and chromic acids; acetylenic alcoauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds 65 such as benzotriazole, tolyltriazole, and mercaptobenzothiazole and their respective salts; nitrated or sulfonated petroleum derivatives; and organic acid derivatives.

First fibrous layer 40 in certain embodiments of the invention is a spun-laced non-woven material. Acceptable materials for first fibrous layer 40 can be natural or synthetic and include organic and inorganic fibers and bioplastic materials. Examples include, but are not limited to, cotton, viscose, rayon, acetate, polyamid, nylon, polyester, acrylic, polyethylene terephthalate ("PET"), polypropylene ("PP"), polyethylene ("PE"), polylactic acid ("PLA"), polyurethane, glass and/or other fibers suitable for producing spun-laced nonwoven material. In certain embodiments of the invention, the staple fibers used to produce first fibrous layer 40 are crimped staple fibers suitable for carding, hydroentangling, and heat drying. Denier of the fibers utilized can vary depending on the production method. In one embodiment of the invention, the fibers have a denier of less than 3. In certain embodiments, the fibers have a denier between 0.5 and 1.5. The basis weight of first fibrous layer 40 can vary based on the intended use of composite fabric 10. In one embodiment of the invention, the basis weight of first fibrous layer 40 is between 10 g/m$^2$ and 100 g/m$^2$. In one embodiment of the invention, the basis weight of first fibrous layer 40 is 25 g/m$^2$.

Multiple samples were prepared to test the level of adhesion between films 20 and first fibrous layers 40 according to embodiments of the present invention. The samples were prepared by applying an adhesive 30 to a film 20 and laminating film 20 to a fibrous layer 40. One set of samples was prepared using AL34-149-1 adhesive ("Embodiment 1") and another set of samples was prepared using AL1262 adhesive ("Embodiment 2"). Both adhesives included a vapor corrosion inhibitor. The samples were prepared using the following production specifications:

| Film Material | Fibrous Layer Material | Sample Width | Amount of Adhesive | Line Speed | Adhesive Hopper, Hose and Head T | Air Pressure Applied Adhesive Exiting Head | Air Spray T | Roller Nip Pressure |
|---|---|---|---|---|---|---|---|---|
| Polyurethane | Polyester | 20.32 cm | 30 g/m$^2$ | 22.86 m/min | 168.33° C. | 4.83 N/cm$^2$ | 190.56° C. | 51.71 N/cm$^2$ |

Because film 20 is produced from a non-heat shrinking thermoplastic material, it will not distort when it comes into contact with the hot adhesive.

The samples of the present invention were submerged in water for 24 hours and their saturated bond strength adhesion was tested by using a tensile testing machine and compared to their dry bond strength adhesion. The same test was performed on a prior art composite fabric product that utilizes a heat shrinkable film. The average results for five samples of the prior art and five samples of each of two embodiments of the present invention are set forth in the table below, in which "MD" indicates adhesion in the machine direction (i.e., along the length of the sample) and "CD" indicates adhesion in the cross direction (i.e., across the width of the sample). The adhesion results are reported in g/cm.

| | Prior Art | | Embodiment 1 | | Embodiment 2 | |
|---|---|---|---|---|---|---|
| | MD | CD | MD | CD | MD | CD |
| Dry Bond Strength Adhesion | 774.80 | 714.96 | 1,101.18 | 1,227.95 | 1,114.96 | 1,202.36 |
| Wet Bond Strength Adhesion | 24.80 | 15.75 | 1,220.87 | 1,427.95 | 1,198.03 | 1,188.58 |
| % Adhesion Loss or Gain | −96.81% | −97.82% | 10.88% | 16.27% | 7.48% | −1.15% |

As shown in the table above, the bond strength adhesion of the prior art product degraded considerably after soaking in water. In contrast the bond strength adhesion of Embodiment 1 increased significantly. Furthermore, the bond strength adhesion of Embodiment 2 increased significantly in the machine direction and showed only minimal degradation in the cross direction.

Fabric layer 50 may be joined to first fibrous layer 40 by a hydroentanglement process, such as those used in known spunlaced production methods. Unlike prior art devices that utilize a scrim, fabric layer 50 is a continuous membrane of material. Fabric layer 50 is, in certain embodiments of the invention, a non-woven fabric material. Examples of suitable fabric materials for fabric layer 50 include, but are not limited to, knitted fabrics and spunbond fabrics made from polyamid, nylon, polypropylene, polyester, polyamide, PLA and/or polyurethane. Fabric layer 50 in certain embodiments of the invention includes vapor corrosion inhibitors 51. The VCI's discussed above in connection with adhesive 30 are examples of VCI's suitable for incorporation into fabric layer 50.

Second fibrous layer 60 may be made from the same materials and in the same manners as discussed above in connection with first fibrous layer 40, and may have the same physical properties. In certain embodiments of the invention, second fibrous layer 60 is identical to first fibrous layer 40. In other embodiments of the present invention, second fibrous 60 and first fibrous layer 40 are different. Second fibrous layer 60 may be joined to fabric layer 50 by a hydroentanglement process.

As noted above, in certain embodiments of the invention, first fibrous layer 40, fabric layer 50, and/or second fibrous layer 60 may be constructed in whole or in part from PLA, such as PLA that is produced from corn or another renewable resource. Because PLA is biodegradable, composite fabrics 10 that include PLA are environmentally friendly.

Retaining members 70, in the embodiment shown, are connected to and extend from one side of second fibrous layer 60. Retaining members 70 function to resist movement, including sliding movement, of composite fabric 10 across the surface of the object being protected by cover 10. Retaining members 70 are produced from a material that will provide sufficient frictional engagement with the surface of the object being protected by composite fabric 10. In one embodiment of the invention, retaining members 70 are made of polyurethane. In certain embodiments of the invention, retaining members 70 are constructed from formulation FL2030 available from Key Polymer Corporation of Lawrence, Massachusetts. In other embodiments, retaining members 70 are made from epoxy. Retaining members 70 may be produced by utilizing a thermoset or a thermoplastic ink that is printed onto second fibrous layer 60. The ink used to produce retaining members 70 preferably has a viscosity of 30,000 centipoise or higher at ambient temperature, which assists formation of raised retaining members 70. Certain samples of embodiments of the present invention were partially produced at Spectra Coating Corp. of Leominster, Massachusetts on equipment that printed and dried retaining members 70 on second fibrous layer 60. Retaining members 70 may be printed onto second fibrous layer 60 either before or after laminating to film 20.

Retaining members 70 may include corrosion inhibitors 71, which may be VCI's or contact corrosion inhibitors. Contact corrosion inhibitors resist metal corrosion via contact with the metal. In embodiments of the invention that utilize corrosion inhibitors 71, the ink used to produce retaining members 70 has a pH of about 8 or higher, which results in better corrosion inhibition. The VCI's discussed in connection with vapor corrosion inhibitors 51 above are also suitable for use as corrosion inhibitors 71. Corrosion inhibitors 71 need not be the same as vapor corrosion inhibitors 51. If contact corrosion inhibitors are used, they can be located on or near the outer surface of retaining members 70.

Composite fabric 10 can be formed in any one of a number of manners. In one embodiment of the invention, first fibrous layer 40, fabric layer 50, and second fibrous layer 60 are joined together as, for example, by a hydroentanglement process as described above. Retaining members 70 are then applied to second fibrous layer 60, such as by printing as described above. Film 20 is then laminated to first fibrous layer 40 as described above. Alternatively, first fibrous layer 40, fabric layer 50, and second fibrous layer 60 are first joined together, followed by laminating film 20 to first fibrous layer 40. Retaining members 70 are then applied to second fibrous layer 60.

Composite fabric 10 can be formed into any desired configuration. For example, as shown in FIG. 3, composite fabric 10 can be formed into a custom fit cover 100 that is specially configured to protect a vehicle 110 having a surface 111. In use, retaining members 70 contact surface 111 of vehicle 110 (FIG. 4), thereby holding the remainder of cover 100 away from surface 111. In this manner, should second fibrous layer 60 become wet, retaining members 70 hold it away from surface 111, thereby keeping surface 111 drier and resisting corrosion. This configuration also creates pockets in which the VCI can collect. The pockets also assist with evaporation of condensation. Retaining members 70 also help secure cover 100 to vehicle 110, such as when high winds push cover 100 toward or relative to vehicle 110 and the friction between retaining members 70 and surface 111 resists movement of cover 100. In certain embodiments of the invention, retaining members 70 are capable of retaining cover 100 on vehicle 110 under wind speed conditions of from about 119 km/h to about 252 km/h. Furthermore, frictional heat generated by movement between retaining members 70 and surface 111 will facilitate the release of vapor corrosion inhibitors 71, which helps prevent corrosion of vehicle 110 and surface 111. Over time, some of the vapor corrosion inhibitors 51 will also migrate from fabric layer 50 toward surface 111 of vehicle 110 and help prevent corrosion.

Figure 2:
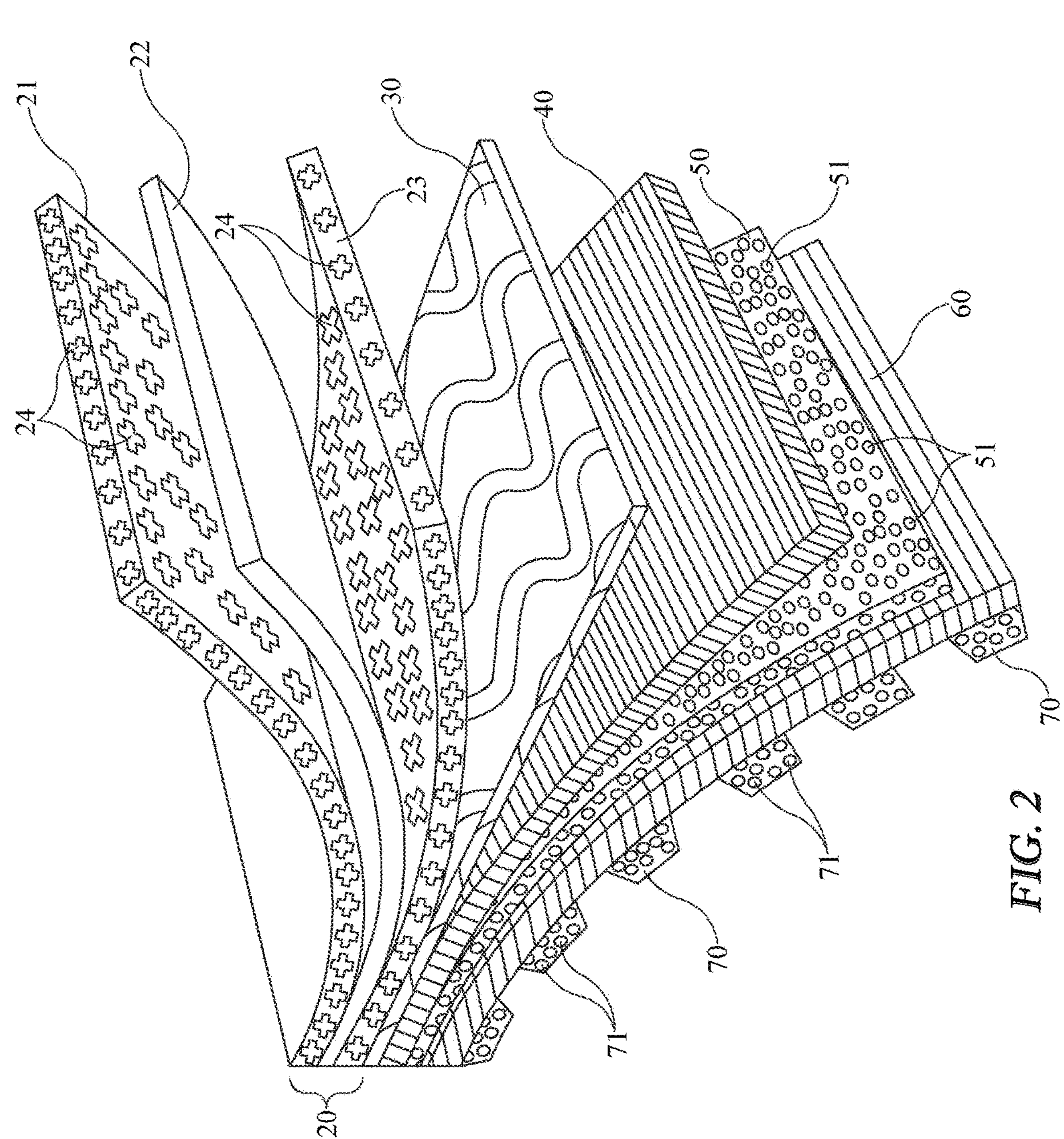
FIG. 2 is a partially exploded view of the protective composite fabric shown in FIG. 1.
Figure 5:
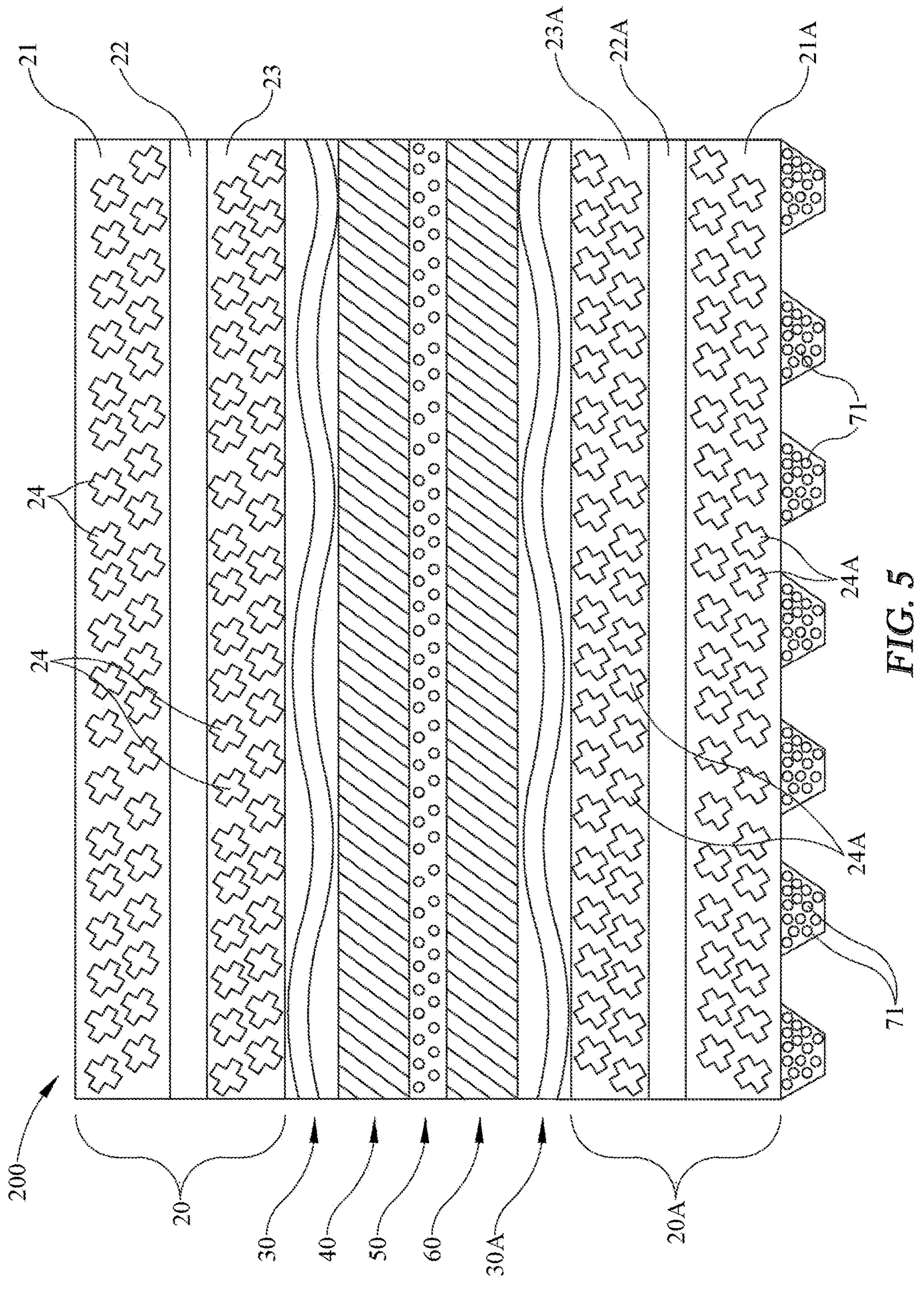
FIG. 5 is a cross sectional view of a protective composite fabric according to another embodiment of the present invention.

FIG. 5 is a cross sectional view of a composite fabric 200 according to another embodiment of the present invention. Like the embodiment of FIGS. 1 and 2, this embodiment includes film 20, adhesive 30, first fibrous layer 40, fabric layer 50, second fibrous layer 60, and retaining members 70. However, composite fabric 200 also includes a second film 20A between second fibrous layer 60 and retaining members 70. Second film 20A can be connected to second fibrous layer 60 by a second adhesive 30A in the same manner as described above for connecting film 20 to first fibrous layer 40. Second film 20A can be constructed in the same manners and from the same materials discussed above in connection with film 20. The pH modifiers 24 discussed above can also be utilized as pH modifiers 24A in connection with second film 20A. Note, however, that film 20 and film 20A (as well as pH modifiers 24 and 24A) of a particular fabric 200 do not have to be constructed in the same manner or from the same materials. Any of the adhesives discussed above that are suitable for use as adhesive 30 are also suitable for use as adhesive 30A. However, different adhesives can be used as adhesive 30 and adhesive 30A in any given composite fabric 200. In another embodiment of the invention, retaining members 70 are attached to both film 20 and second film 20A. Retaining members 70 may be printed onto film 20 and/or second film 20A either before or after laminating the films to first fibrous layer 40 and second fibrous layer 60.

Composite fabric 200 can be formed in any one of a number of manners. In one embodiment of the invention, first fibrous layer 40, fabric layer 50, and second fibrous layer 60 are first joined together, followed by laminating film 20 to first fibrous layer 40. Retaining members 70 are then applied to second film 20A, which is then laminated to second fibrous layer 60. Alternatively, first fibrous layer 40, fabric layer 50, and second fibrous layer 60 are first joined together, followed by laminating film 20 to first fibrous layer 40 and laminating second film 20A to second fibrous layer 60. Retaining members 70 are then connected to second film 20A.

In other embodiments of the invention, infrared ("IR") shielding, radio frequency ("RF") shielding, electromagnetic pulse ("EMP") shielding, high-powered microwave ("HPM") shielding, directed-energy weapons ("DEW") shielding, and/or electromagnetic interference ("EMI") shielding can be incorporated into fabrics and covers of the present invention. As used in this application, the terms "electromagnetic shielding" and "EMI shielding" include all of the forgoing types of shielding and all other types of shielding designed to block, inhibit, reduce or otherwise disrupt infrared, electronic, radio, microwave, static, magnetic and other similar forms of interference. Shielding electronics and other sensitive equipment from such interference helps isolate electrical devices from the surroundings and may protect equipment from electronic attacks, such as RFID virus attacks in which a malicious code is inserted into an RFID tag to alter or corrupt data in an RFID system or equipment.

EMI shielding can be incorporated into composite fabric 10 in a number of ways. For example, conductive modifiers, such as carbon or metal, can be incorporated into one or more layers of composite fabric 10 to lower the surface and volume resistivity of the layers so that they can dissipate electrostatic charges and attenuate electromagnetic signals. The shielding materials can be incorporated into film, fibrous layers, fabric layer, and/or retaining members of embodiments of the present invention. The EMI shielding materials can be used to construct the film, fibrous layers, fabric layer, and/or retaining members of composite fabric 10, can be incorporated as a component of those parts of composite fabric 10, and/or can be applied to those parts of composite fabric 10 as a coating. In certain embodiments of the present invention, EMI shielding material is incorporated into adhesive 30. In other embodiments, a separate layer, such as a fabric layer with EMI shielding functionality, is included in composite fabric 10 as an additional layer.

For example, in certain embodiments of the present invention, EMI shielding is provided by incorporating carbon modifiers into components of the present invention in amounts of 5 to 25%. Carbon modifiers in the form of fibers can be derived from polyacrylonitrile ("PAN"). In certain embodiments of the present invention, PAN carbon fibers are incorporated in amounts up to 10% by weight of composite fabric 10. EMI shielding values of 30 dB to 50 dB can be achieved by incorporating approximately 50% by weight PAN carbon fibers into composite fabric 10. Microcarbon fibers may achieve similar EMI shielding values at amounts as low as 3% by weight of composite fabric 10. Other effective EMI shielding materials include nickel coated carbon fibers, stainless steel fibers (at levels of 5% to 10% by weight of composite fabric 10), copper and aluminum.

In certain embodiments of the invention, EMI shielding effectiveness of between about 1 dB and about 100 dB or more can be achieved by utilizing different coatings that include aluminum, silver, nickel, copper or combinations of these materials. The coatings utilized can be solvent based or water based systems. One embodiment of the invention utilizes a water based silver coating, such as Series 599-Z6098-01 from PPG Industries, Inc. of Pittsburgh, Pennsylvania. The coating may be applied to the surface of the film, the surface of the fibrous layers, and/or the surface of the fabric layer. It can also be used to coat the individual strands of the fibrous and fabric layers. The coating system can also be added to the retaining members, used to coat the retaining members, and/or incorporated into the VCI system of the retaining members.

In certain embodiments of the present invention, one or more components of composite fabric 10 is constructed to form a Faraday cage or Faraday shield. This construction is particularly useful for blocking electromagnetic pulses, which can disrupt, degrade the performance of, and/or damage electronic components.

Covers made from composite fabrics 10 of the present invention can be manufactured by sewing, welding (such as, for example, impulse bar welding, ultrasonic welding, and RFID welding) and/or other methods. However, welded cover seams may result in better EMI shielding capabilities.

Although the present invention has been shown and described in detail, the same is by way of example only and should not be taken as a limitation on the invention. Numerous modifications can be made to the embodiments disclosed without departing from the scope of the present invention. For example, the protective cover can be formed into configurations other than those shown and described and can be used to protect objects other than vehicles. Also, vapor corrosion inhibitors could be incorporated into adhesive 30. Other modifications and variations are also within the scope of the invention.

What is claimed is:

1. A composite fabric, comprising:
a film having a first side and a second side;
a first fibrous layer having a first side facing the second side of the film and a second side;
a fabric layer having a first side facing the second side of the first fibrous layer and a second side;
a second fibrous layer having a first side facing the second side of the fabric layer and a second side; and
a plurality of retaining members connected to and extending away from the second side of the second fibrous layer, the plurality of retaining members configured to contact a surface on which the composite fabric is placed to resist movement of the composite fabric relative to the surface and such that the second side of the fibrous layer is entirely spaced from the surface wherein the plurality of retaining members and the second side of the second fibrous layer cooperate with the surface to form at least one pocket.

2. The composite fabric of claim 1, wherein the retaining members include a first vapor corrosion inhibitor configured to vaporize and collect between the surface and the second side of the second fibrous layer.

3. The composite film of claim 1, wherein the film is a non-heat shrinking film.

4. The composite fabric of claim 1, wherein the retaining members comprise epoxy.

5. The composite fabric of claim 1, wherein the retaining members comprise polyurethane.

6. The composite fabric of claim 1, further comprising: a pH modifier.

7. The composite fabric of claim 1, further comprising: an adhesive positioned between and configured to connect the film and the first fibrous layer.

8. The composite fabric of claim 7, further comprising: a second vapor corrosion inhibitor in the adhesive.

9. The composite fabric of claim 1, further comprising: an electromagnetic interference shielding layer.

10. The composite fabric of claim 9, wherein the electromagnetic interference shielding layer is positioned between the film layer and the first fibrous layer.

11. A composite fabric, comprising:
- a film having a first side and a second side;
- a first fibrous layer having a first side facing the second side of the film and a second side;
- a fabric layer having a first side facing the second side of the first fibrous layer and a second side;
- a second fibrous layer having a first side facing the second side of the fabric layer and a second side; and
- a plurality of retaining members connected to and extending from the second side of the second fibrous layer and configured to contact a surface on which the composite fabric is placed and resist movement of the composite fabric relative to the surface, wherein the plurality of retaining members are configured such that a majority of the second side of the second fibrous layer is spaced from the surface, and wherein the plurality of retaining members form at least one pocket between one or more of the plurality of retaining members, the second side of the second fibrous layer and the surface.

12. The composite fabric of claim 11, wherein the second side of the second fibrous layer is entirely spaced from the surface.

13. The composite fabric of claim 11, wherein the plurality of retaining members include a corrosion inhibitor configured to collect between the second fibrous layer and the surface.

14. The composite fabric of claim 13, wherein the corrosion inhibitor comprises a first vapor corrosion inhibitor.

15. The composite fabric of claim 14, wherein the first corrosion inhibitor vaporizes and collects in one or more of the pockets.

16. The composite fabric of claim 11, further comprising: a pH modifier.

17. The composite fabric of claim 11, further comprising: an adhesive between and connecting the film and the first fibrous layer, wherein the adhesive includes a second vapor corrosion inhibitor.

18. The composite fabric of claim 11, further comprising: an electromagnetic interference shielding layer positioned between the film layer and the first fibrous layer.

19. A composite fabric, comprising:
- a film having a first side and a second side;
- a fabric layer having a first side and a second side;
- at least one fibrous layer having a first side and a second side, wherein the at least one fabric layer is positioned between the film layer and the at least one fibrous layer; and
- a plurality of retaining members configured to contact a surface on which the composite fabric is placed and for resisting movement of the composite fabric relative to the surface, the retaining members connected to and extending from the second side of the at least one fibrous layer such that the second side of the at least one fibrous layer is entirely spaced from the surface, wherein the retaining members include a first vapor corrosion inhibitor, and wherein the plurality of retaining members form at least one pocket between one or more of the plurality of retaining members, the second side of the at least one fibrous layer, and the surface, and wherein at least a portion of the first vapor corrosion inhibitor collects in one or more of the pockets.

20. The composite fabric of claim 19, wherein the at least one fibrous layer includes a first fibrous layer that includes the first side of the at least one fibrous layer and a second fibrous layer that includes the second side of the at least one fibrous layer, wherein the first side of the at least one fibrous layer is connected to the second side of the film, and wherein the fabric layer is sandwiched between the first and second fibrous layers.

21. The composite fabric of claim 19, wherein the film is a non-heat shrinking film.

22. The composite fabric of claim 19, wherein the retaining members comprise epoxy.

23. The composite fabric of claim 19, wherein the retaining members comprise polyurethane.

24. The composite fabric of claim 19, further comprising: a pH modifier.

25. The composite fabric of claim 19, further comprising: an adhesive positioned between and configured to connect the film and the at least one fibrous layer.

26. The composite fabric of claim 25, further comprising: a second vapor corrosion inhibitor in the adhesive.

27. The composite fabric of claim 19, further comprising: electromagnetic interference shielding.

28. The composite fabric of claim 27, wherein the electromagnetic interference shielding is positioned between the film layer and the at least one fibrous layer.

* * * * *